US011770393B2

(12) United States Patent
Moore (10) Patent No.: US 11,770,393 B2
(45) Date of Patent: Sep. 26, 2023

(54) SYSTEM AND METHOD FOR TARGET BEHAVIOR DISCOVERY AND DETECTION

(71) Applicant: JPMorgan Chase Bank, N.A., New York, NY (US)

(72) Inventor: Devin C Moore, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 628 days.

(21) Appl. No.: 16/997,241

(22) Filed: Aug. 19, 2020

(65) Prior Publication Data

US 2022/0060489 A1   Feb. 24, 2022

(51) Int. Cl.
*H04L 29/06* (2006.01)
*G06N 20/00* (2019.01)
*G06N 5/04* (2023.01)
*H04L 9/40* (2022.01)

(52) U.S. Cl.
CPC .......... *H04L 63/1425* (2013.01); *G06N 5/04* (2013.01); *G06N 20/00* (2019.01); *H04L 63/1416* (2013.01); *H04L 63/1441* (2013.01)

(58) Field of Classification Search
CPC ............. H04L 63/1425; H04L 63/1416; H04L 63/1408; H04L 63/1441; G06N 5/04; G06N 20/00
See application file for complete search history.

(56) References Cited

U.S. PATENT DOCUMENTS

| 9,967,275 | B1 * | 5/2018 | Koi | H04L 63/1425 |
| 10,581,915 | B2 * | 3/2020 | Scherman | H04L 63/1425 |
| 10,609,057 | B2 * | 3/2020 | Igbe | H04L 63/1425 |
| 11,194,915 | B2 * | 12/2021 | Stolfo | G06F 21/577 |
| 11,212,299 | B2 * | 12/2021 | Gamble | H04L 63/1433 |
| 2018/0063168 | A1 * | 3/2018 | Sofka | G06N 3/044 |
| 2020/0167465 | A1 * | 5/2020 | Ashino | G06F 13/00 |
| 2021/0390564 | A1 * | 12/2021 | Chibanda | G06Q 10/0635 |
| 2023/0143232 | A1 * | 5/2023 | Balazs | H04L 63/0876 709/223 |

* cited by examiner

*Primary Examiner* — Joseph P Hirl
*Assistant Examiner* — Thomas A Gyorfi
(74) *Attorney, Agent, or Firm* — GREENBLUM & BERNSTEIN. P.L.C.

(57) ABSTRACT

Various methods, apparatuses/systems, and media for detecting a target behavior are disclosed. A processor implements a machine learning cadence model that implements an algorithm to obtain, on a per session basis, cadence data that indicates average time between each call and a standard deviation of times across each call across all active sessions of a desired target. The processor compares the cadence data to predefined background cadence data to identify whether the desired target is a new threat target or a background traffic; generates an internet protocol (IP) address of the new threat target; inputs the IP address of the new threat target into a machine learning behavior model that implements an algorithm to generate a fingerprint of all known places that the new threat target is operating; and applies a mitigation algorithm to all active sessions of the new threat target.

20 Claims, 5 Drawing Sheets

SYSTEM AND METHOD FOR TARGET BEHAVIOR DISCOVERY AND DETECTION

TECHNICAL FIELD

This disclosure generally relates to target behavior discovery and detection, and, more particularly, to methods and apparatuses for implementing a machine learning model for target behavior discovery and detection, thereby allowing appropriately classifying the behavior of the target in order to mitigate the actions of the target in an efficient manner.

BACKGROUND

In today's digital environment, often there appears to be one or more targets operating on digital properties of an organization. These targets, if not detected early, may substantially cause damage to the digital properties resulting significant financial loss to the organization in mitigating these damages. Thus, it may be extremely beneficial for management of such organization to know that there is actually a target operating on the digital properties of the organization; ii) that the behavior of the target may be classified as like or unlike another known target; iii) how to mitigate the actions of the target in their current state; iv) how to adjust to evasive action by the target to identify and mitigate their behavior into the future: v) what other areas in the digital environment the target is operating, etc., in order to maintaining a healthy digital environment. Although some conventional systems may have capabilities to detect a malicious target after such target has already caused a significant damage to the digital properties, these conventional systems lack the capabilities to early detect a behavior of a target, or to classify the behavior of the target in a manner that can help mitigate the behavior of the target efficiently and accurately.

SUMMARY

The present disclosure, through one or more of its various aspects, embodiments, and/or specific features or sub-components, provides, among other features, various systems, servers, devices, methods, media, programs, and platforms for implementing a multi-phase machine learning model and application solution for target behavior discovery and detection, thereby allowing appropriately classifying the behavior of the target in order to mitigate the actions of the target in an efficient manner, but the disclosure is not limited thereto. For example, the present disclosure, through one or more of its various aspects, embodiments, and/or specific features or sub-components, also provides, among other features, various systems, servers, devices, methods, media, programs, and platforms for applying the multi-phase machine learning model and application solution to discover the existence of a target early, classify the behavior of the target as like or unlike another known target, mitigate the actions of the target in their current state, adjust to evasive action by the target to identify and mitigate their behavior into the future, and discover other places where the target may be operating, etc., but the disclosure is not limited thereto.

According to an aspect of the present disclosure, a method for detecting a target behavior by utilizing one or more processors and one or more memories is disclosed. The method may include: implementing a machine learning cadence model that operates based on a plurality of different log activities corresponding to a desired target: applying the machine learning cadence model that implements an algorithm to obtain, on a per session basis, cadence data that indicates average time between each call as well as a standard deviation of times across each call across all active sessions of the desired target: comparing the cadence data to predefined background cadence data to identify whether the desired target is a new threat target or a background traffic; generating an internet protocol (IP) address of the new threat target when a result of comparing the cadence data to the predefined background cadence data indicates a relatively higher percentage of match data with similar traffic of known threat targets; inputting the IP address of the new threat target into a machine learning behavior model that implements an algorithm to generate a fingerprint of all known places that the new threat target is operating: and applying a mitigation algorithm to all active sessions of the new threat target.

According to a further aspect of the present disclosure, the method may further include: generating a relatively higher percentage matched value based on determining that the distances between the calls and the timing between the calls during the active sessions of the desired target are regular across sessions; classifying the desired target as a new threat target; and applying the mitigation algorithm to either shape the traffic or block all active sessions of the new threat target.

According to yet another aspect of the present disclosure, wherein know targets by themselves show about 80%-85% similar traffic to the cadence model, and the method further include: classifying the desired target as a new threat target when the relatively higher percentage matched value indicates a value at least within the range of 80%-85% or more of similar traffic when the cadence model is run against the desired target.

According to a further aspect of the present disclosure, the method may further include: generating a relatively lower percentage matched value based on determining that the distances between the calls and the timing between the calls during the active sessions of the desired target are different across sessions; classifying the desired target as a regular traffic; and determining that no mitigation is required for the desired target.

According to another aspect of the present disclosure, wherein the background cadence data shows about 10%-15% similar traffic to the known targets, and the method further include: classify the desired target as a regular traffic when the relatively lower percentage matched value indicates a value at least within the range of 10%-15% or less when the cadence model is run against the desired target.

According to an additional aspect of the present disclosure, the method may further include: generating a list of uniform resource locators (URLs) of all end points accessed by the desired target during the session; and creating a unique hash that represents a combination of the URLs.

According to yet another aspect of the present disclosure, the method may further include: generating a list of top five most common hashes that represents the top five end points accessed by the desired target during the session.

According to another aspect of the present disclosure, the method may further include: generating a list of top five most common hashes that represents the top five end points accessed by each of known targets, wherein a list of top five most common hashes for one known target is different from a list of top five most common hashes of other known targets.

According to an additional aspect of the present disclosure, the method may further include: generating a machine learning model of list of the top five most common hashes of all known targets; and running the machine learning model of list of the top five most common hashes against the desired target to determine whether the desired target matches a known target that requires mitigation, or whether the desired target matches a real traffic that does not require mitigation.

According to yet another aspect of the present disclosure, the method may further include: classifying the desired target as a new unknown target that requires mitigation when running the machine learning model of list of the top five most common hashes against the desired target results that the desired target neither matches a known target nor matches a real traffic; and applying the mitigation algorithm to block the new unknown target.

According to a further aspect of the present disclosure, a system for detecting a target behavior is disclosed. The system may include a database for storing a machine learning cadence model and a machine learning behavior model and a processor operatively connected to the database via a communication network. The processor may be configured to: implement the machine learning cadence model that operates based on a plurality of different log activities corresponding to a desired target: apply the machine learning cadence model that implements an algorithm to obtain, on a per session basis, cadence data that indicates average time between each call as well as a standard deviation of times across each call across all active sessions of the desired target; compare the cadence data to predefined background cadence data stored in the database to identify whether the desired target is a new threat target or a background traffic; generate an internet protocol (IP) address of the new threat target when a result of comparing the cadence data to the predefined background cadence data indicates a relatively higher percentage of match data with similar traffic of known threat targets; input the IP address of the new threat target into the machine learning behavior model that implements an algorithm to generate a fingerprint of all known places that the new threat target is operating; and apply a mitigation algorithm to all active sessions of the new threat target.

According to another aspect of the present disclosure, the processor may be further configured to: generate a relatively higher percentage matched value based on determining that the distances between the calls and the timing between the calls during the active sessions of the desired target are regular across sessions; classify the desired target as a new threat target; and apply the mitigation algorithm to either shape the traffic or block all active sessions of the new threat target.

According to yet another aspect of the present disclosure, wherein know targets by themselves show about 80%-85% similar traffic to the cadence model, and wherein the processor may be further configured to: classify the desired target as a new threat target when the relatively higher percentage matched value indicates a value at least within the range of 80%-85% or more of similar traffic when the cadence model is run against the desired target.

According to an aspect of the present disclosure, wherein the processor may be further configured to: generate a relatively lower percentage matched value based on determining that the distances between the calls and the timing between the calls during the active sessions of the desired target are different across sessions: classify the desired target as a regular traffic; and determine that no mitigation is required for the desired target.

According to a further aspect of the present disclosure, wherein the background cadence data shows about 10%-15% similar traffic to the known targets, and wherein the processor may be further configured to: classify the desired target as a regular traffic when the relatively lower percentage matched value indicates a value at least within the range of 10%-15% or less when the cadence model is run against the desired target.

According to an aspect of the present disclosure, wherein the processor may be further configured to: generate a list of uniform resource locators (URLs) of all end points accessed by the desired target during the session; and create a unique hash that represents a combination of the URLs.

According to a further aspect of the present disclosure, the processor may be further configured to: generate a list of top five most common hashes that represents the top five end points accessed by the desired target during the session.

According to yet another aspect of the present disclosure, the processor may be further configured to: generate a list of top five most common hashes that represents the top five end points accessed by each of known targets, wherein a list of top five most common hashes for one known target is different from a list of top five most common hashes of other known targets According to a further aspect of the present disclosure, the processor may be further configured to: generate a machine learning model of list of the top five most common hashes of all known targets; and run the machine learning model of list of the top five most common hashes against the desired target to determine whether the desired target matches a known target that requires mitigation, or whether the desired target matches a real traffic that does not require mitigation.

According to an additional aspect of the present disclosure, the processor may be further configured to: classify the desired target as a new unknown target that requires mitigation when running the machine learning model of list of the top five most common hashes against the desired target results that the desired target neither matches a known target nor matches a real traffic; and apply the mitigation algorithm to block the new unknown target.

According to another aspect of the present disclosure, a non-transitory computer readable medium configured to store instructions for detecting a target behavior is disclosed. The instructions, when executed, may cause a processor to perform the following: implementing a machine learning cadence model that operates based on a plurality of different log activities corresponding to a desired target: applying the machine learning cadence model that implements an algorithm to obtain, on a per session basis, cadence data that indicates average time between each call as well as a standard deviation of times across each call across all active sessions of the desired target: comparing the cadence data to predefined background cadence data to identify whether the desired target is a new threat target or a background traffic; generating an internet protocol (IP) address of the new threat target when a result of comparing the cadence data to the predefined background cadence data indicates a relatively higher percentage of match data with similar traffic of known threat targets; inputting the IP address of the new threat target into a machine learning behavior model that implements an algorithm to generate a fingerprint of all known places that the new threat target is operating; and applying a mitigation algorithm to all active sessions of the new threat target.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Terms such as "substantially," "about," or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Figure 1:
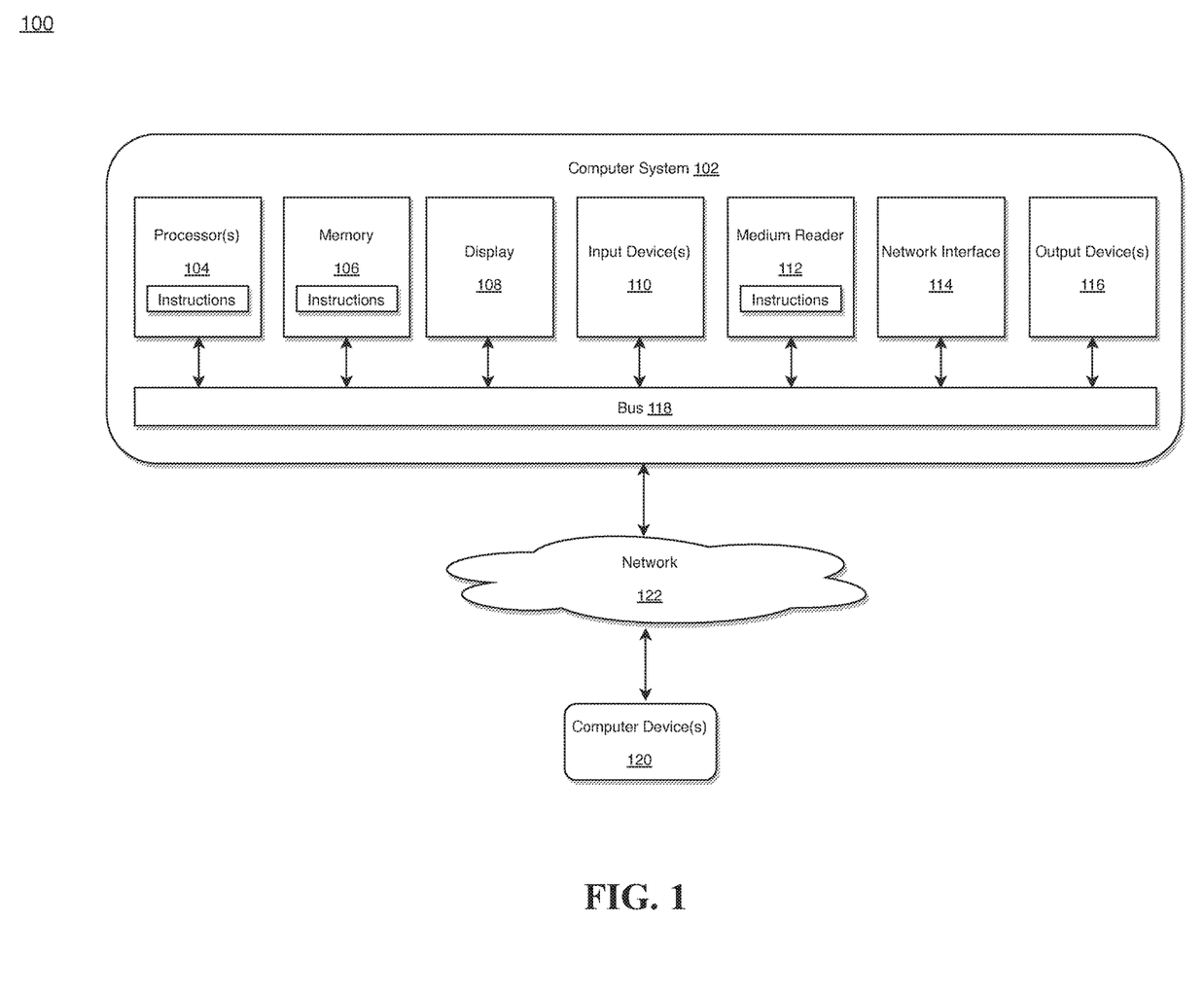
FIG. 1 illustrates a computer system for implementing a target behavior detection module in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an automation testing module for automating nonfunctional testing of software application much faster, easier and more efficient compared to conventional testing by creating a plurality of production robots. As disclosed herein, the various aspects, embodiments, features, and/or sub-components may also provide optimized processes of implementing an automation testing module for creating a plurality of production robots (i.e., various modules programmed to perform certain tasks) that focus on validating readiness of an application for production in the lower environments (i.e., in development environment or other lower environments prior to entering into production environment) by automatically testing frequently (or continuously) that nonfunctional requirements are met for resiliency, performance, monitoring, logging and other requirements identified for stability, but the disclosure is not limited thereto. In addition, various aspects, embodiments, features, and/or sub-components disclosed herein may also provide optimized processes of implementing an automation testing module for creating a plurality of production robots that, for any escapes of testing that make it to production environment, detect problems and orchestrate actions to remediate and prevent/reduce customer impacts, thereby allowing teams to spend more time focused on increasing the capabilities of the robots proactively versus reacting to incidents, but the disclosure is not limited thereto.

Figure 2:
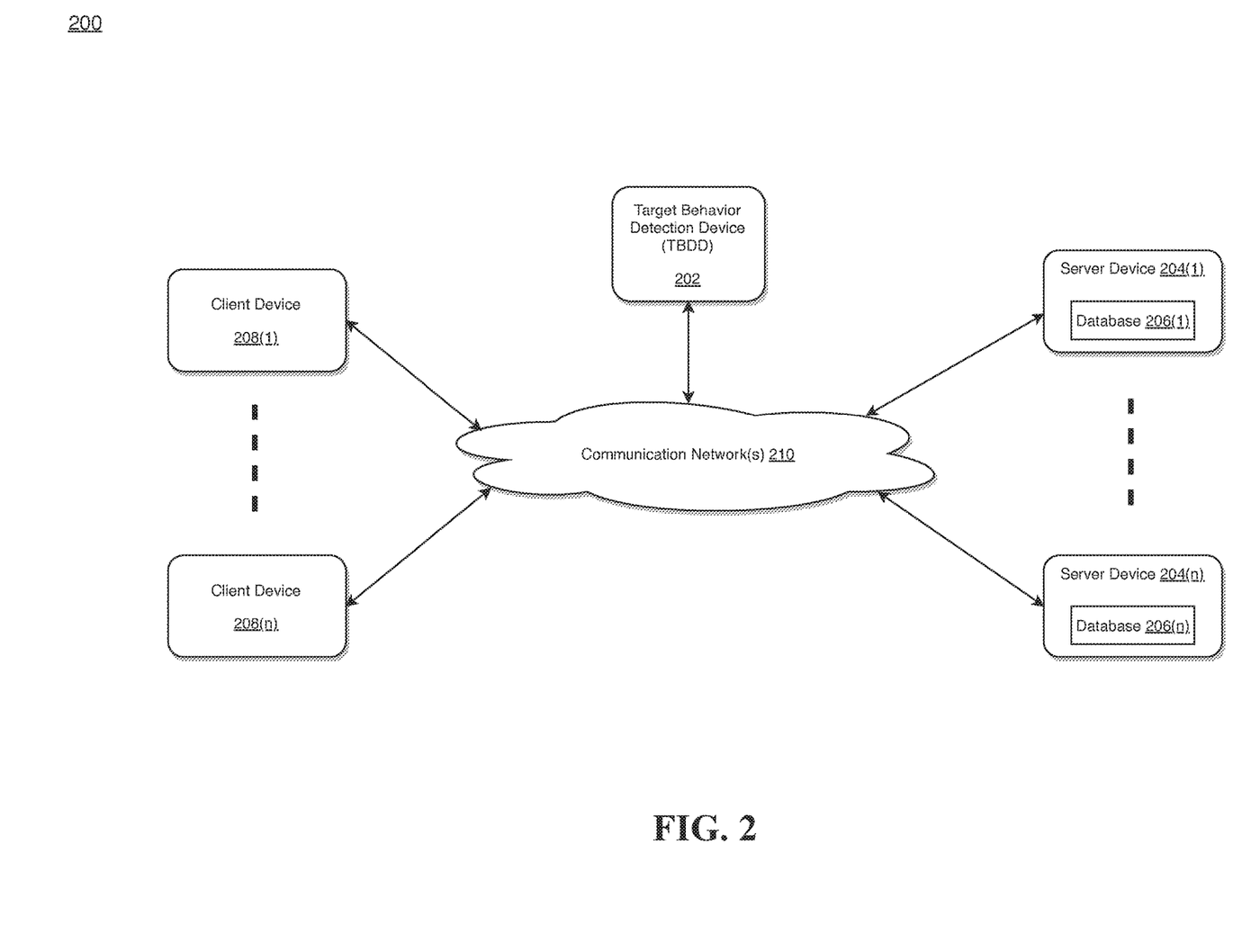
FIG. 2 illustrates an exemplary diagram of a network environment with a target detection testing device in accordance with an exemplary embodiment.

Referring to FIG. 2, a schematic of an exemplary network environment 200 for implementing target behavior detection device (TBDD) of the instant disclosure is illustrated.

According to exemplary embodiments, the above-described problems associated with conventional testing system may be overcome by implementing a TBDD 202 having an automation testing module as illustrated in FIG. 2 by creating a plurality of production robots (i.e., various modules programmed to perform certain tasks) that focus on validating readiness of an application for production in the lower environments (i.e., in development environment or other lower environments prior to entering into production environment) by automatically testing frequently (or continuously) that nonfunctional requirements are met for resiliency, performance, monitoring, logging and other requirements identified for stability, but the disclosure is not limited thereto.

The TBDD 202 may be the same or similar to the computer system 102 as described with respect to FIG. 1.

The TBDD 202 may store one or more applications that can include executable instructions that, when executed by the TBDD 202, cause the TBDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TBDD 202 itself, may be located in virtual server(s) running in a cloud-based computing environment rather than being tied to one or more specific physical network computing devices. Also, the application(s) may be running in one or more virtual machines (VMs) executing on the TBDD 202. Additionally, in one or more embodiments of this technology, virtual machine(s) running on the TBDD 202 may be managed or supervised by a hypervisor.

In the network environment 200 of FIG. 2, the TBDD 202 is coupled to a plurality of server devices 204(1)-204(n) that hosts a plurality of databases 206(1)-206(n), and also to a plurality of client devices 208(1)-208(n) via communication network(s) 210. A communication interface of the TBDD 202, such as the network interface 114 of the computer system 102 of FIG. 1, operatively couples and communicates between the TBDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TBDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TBDD 202 may be a standalone device or integrated with one or more other devices or apparatuses, such as one or more of the server devices 204(1)-204(n), for example. In one particular example, the TBDD 202 may be hosted by one of the server devices 204(1)-204(n), and other arrangements are also possible. Moreover, one or more of the devices of the TBDD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TBDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the TBDD 202 that may be configured for implementing a multi-phase machine learning model and application solution for target behavior discovery and detection, thereby allowing appropriately classifying the behavior of the target in order to mitigate the actions of the target in an efficient manner, but the disclosure is not limited thereto. For example, according to exemplary embodiments, the client devices 208(0.1)-208(n) in this example may include any type of computing device that can facilitate the implementation of the TBDD 202 that may be configured for applying the multi-phase machine learning model and application solution to discover the existence of a target early, classify the behavior of the target as like or unlike another known target, mitigate the actions of the target in their current state, adjust to evasive action by the target to identify and mitigate their behavior into the future, and discover other places where the target may be operating, etc., but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the TBDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the TBDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TBDD 202, the server devices 204(1)-204(n), or the client devices 208(1)-208(n), for example, may be configured to operate as virtual instances on the same physical machine. For example, one or more of the TBDD 202, the server devices 204(1)-204(n), or the client devices 208(1)-208(n) may operate on the same physical device rather than as separate devices communicating through communication network(s) 210. Additionally, there may be more or fewer TBDDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
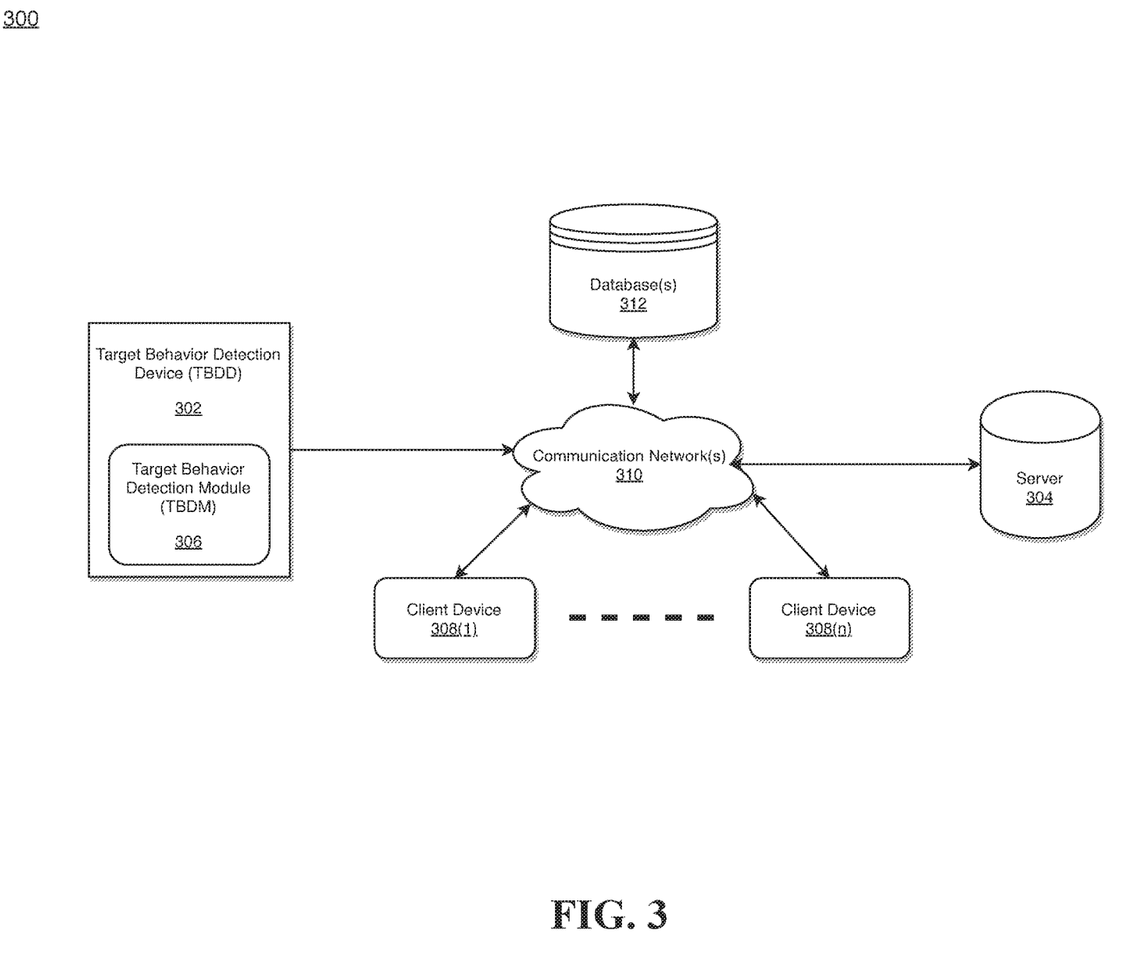
FIG. 3 illustrates a system diagram for implementing a target behavior detection device with a target behavior detection module in accordance with an exemplary embodiment.

FIG. 3 illustrates a system diagram for implementing a target behavior detection device (TBDD) with a target behavior detection module (TBDM) in accordance with an exemplary embodiment.

As illustrated in FIG. 3, the TBDD 302 including the TBDM 306 may be connected to a server 304, and a database(s) 312 via a communication network 310. The TBDD 302 may also be connected to a plurality of client devices 308(1)-308(n) via the communication network 310, but the disclosure is not limited thereto. According to exemplary embodiments, the TBDM 306 may be implemented within the client devices 308(0.1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the TBDD 302 is described and shown in FIG. 3 as including the TBDM 306, although it may include other rules, policies, modules, databases, or applications, for example. According to exemplary embodiments, the database(s) 312 may be embedded within the TBDD 302. Although only one database(s) 312 is illustrated in FIG. 3, according to exemplary embodiments, a plurality of database(s) 312 may be provided. The database(s) 312 may include one or more memories configured to store information including: rules, programs, production requirements, configurable threshold values defined by a product team to validate against service level objective (SLO), machine learning cadence model, machine learning behavior model, log data, hash values, etc., but the disclosure is not limited thereto. According to exemplary embodiments, the TBDM 306 may be configured to be storage platform agnostic—configured to be deployed across multiple storage layers.

According to exemplary embodiments, the TBDM 306 may be configured to receive continuous feed of data from the database(s) 312 via the communication network 310.

As will be described below, the TBDM 306 may be configured to implement a machine learning cadence model that operates based on a plurality of different log activities corresponding to a desired target; apply the machine learning cadence model that implements an algorithm to obtain, on a per session basis, cadence data that indicates average time between each call as well as a standard deviation of times across each call across all active sessions of the desired target: compare the cadence data to predefined background cadence data to identify whether the desired target is a new threat target or a background traffic; generate an internet protocol (IP) address of the new threat target when a result of comparing the cadence data to the predefined background cadence data indicates a relatively higher percentage of match data with similar traffic of known threat targets; input the IP address of the new threat target into a machine learning behavior model that implements an algorithm to generate a fingerprint of all known places that the new threat target is operating; and apply a mitigation algorithm to all active sessions of the new threat target, but the disclosure is not limited thereto.

The plurality of client devices 308(1)-308(n) are illustrated as being in communication with the TBDD 302. In this regard, the plurality of client devices 308(1)-308(n) may be "clients" of the TBDD 302 and are described herein as such. Nevertheless, it is to be known and understood that the plurality of client devices 308(1)-308(n) need not necessarily be "clients" of the TBDD 302, or any entity described in association therewith herein. Any additional or alternative relationship may exist between either or more of the plurality of client devices 308(1)-308(n) and the TBDD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the TBDD 302 via broadband or cellular communication. Of course, these embodiments are merely exemplary and are not limiting or exhaustive.

Figure 4:
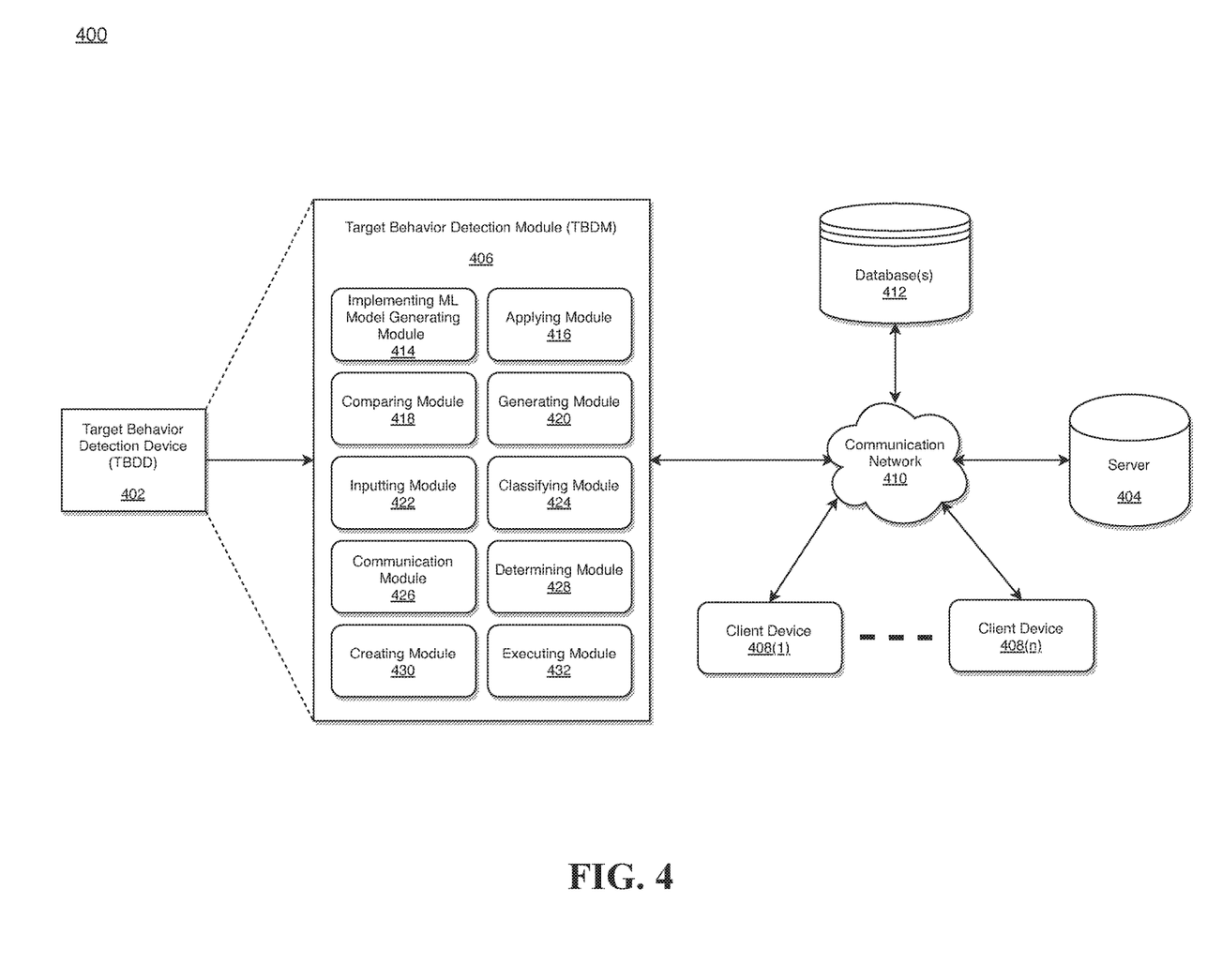
FIG. 4 illustrates a system diagram for implementing a target behavior detection module of FIG. 3 in accordance with an exemplary embodiment.

FIG. 4 illustrates a system diagram for implementing a target behavior detection module of FIG. 3 in accordance with an exemplary embodiment. As illustrated in FIG. 4, the system 400 may include a target behavior detection device (TBDD) 402 within which a target behavior detection module (TBDM) 406 may be embedded, a database(s) 412, a server 404, client devices 408(1)-408(n), and a communication network 410. According to exemplary embodiments, the TBDD 402, TBDM 406, database(s) 412, the server 404, the client devices 408(1)-408(n), and the communication network 410 as illustrated in FIG. 4 may be the same or similar to the TBDD 302, the TBDM 306, the database(s) 312, the server 304, the client devices 308(1)-308(n), and the communication network 310, respectively, as illustrated in FIG. 3.

As illustrated in FIG. 4, the TBDM 406 may include an implementing machine learning model (MLM) generating module 414, an applying module 416, a comparing module 418, a generating module 420, an inputting module 422, a classifying module 424, a communication module 426, a determining module 428, a creating module 430, and an executing module 432. According to exemplary embodiments, the database(s) 412 may be external to the TBDD 402 may include various systems that are managed and operated by an organization. Alternatively, according to exemplary embodiments, the database(s) 412 may be embedded within the TBDD 402 and/or the TBDM 406.

The process may be executed via the communication network 410, which may comprise plural networks as described above. For example, in an exemplary embodiment, the various components of the TBDM 406 may communicate with the server 404, and the database(s) 412 via the communication network 410 and the communication module 426. Of course, these embodiments are merely exemplary and are not limiting or exhaustive.

According to exemplary embodiments, the communication network 410 and the communication module 426 may be configured to establish a link between the database(s) 412, the client devices 408(1)-408(n) and the TBDM 406.

According to exemplary embodiments, each of the implementing MLM generating module 414, applying module 416, comparing module 418, generating module 420, inputting module 422, classifying module 424, communication module 426, determining module 428, creating module 430, and the executing module 432 may be implemented by microprocessors or similar, they may be programmed using software (e.g., microcode) to perform various functions discussed herein and may optionally be driven by firmware and/or software. Alternatively, each of the implementing MLM generating module 414, applying module 416, comparing module 418, generating module 420, inputting module 422, classifying module 424, communication module 426, determining module 428, creating module 430, and the executing module 432 may be implemented by dedicated hardware, or as a combination of dedicated hardware to perform some functions and a processor (e.g., one or more programmed microprocessors and associated circuitry) to perform other functions. Also, according to exemplary embodiments, each of the implementing MLM generating module 414, applying module 416, comparing module 418, generating module 420, inputting module 422, classifying module 424, communication module 426, determining module 428, creating module 430, and the executing module 432 may be physically separated into two or more interacting and discrete blocks, units, devices, and/or modules without departing from the scope of the inventive concepts.

According to exemplary embodiments, the implementing MLM generating module 414 may be configured to implement a machine learning cadence model that operates based on a plurality of different log activities corresponding to a desired target. The application module 416 may be configured to apply the machine learning cadence model that implements an algorithm to obtain, on a per session basis, cadence data that indicates average time between each call as well as a standard deviation of times across each call across all active sessions of the desired target.

According to exemplary embodiments, the comparing module 418 may be configured to compare the cadence data to predefined background cadence data to identify whether the desired target is a new threat target or a background traffic and the generating module 420 may be configured to generate an internet protocol (IP) address of the new threat target when a result of comparing the cadence data to the predefined background cadence data by the comparing module 418 indicates a relatively higher percentage of match data with similar traffic of known threat targets.

According to exemplary embodiments, the inputting module 422 may be configured to input the IP address of the new threat target into a machine learning behavior model stored in the database(s) 412 or the server 404. The machine learning behavior model may implement an algorithm to generate a fingerprint of all known places that the new threat target is operating. The applying module 416 may be configured to apply a mitigation algorithm to all active sessions of the new threat target.

According to exemplary embodiments, the generating module 420 may be configured to generate a relatively higher percentage matched value based on determining by the determining module 428 that the distances between the calls and the timing between the calls during the active sessions of the desired target are regular across sessions. The classifying module 424 may be configured to classify the desired target as a new threat target, and the applying module 416 may be configured to apply the mitigation algorithm to either shape the traffic or block all active sessions of the new threat target.

According to exemplary embodiments, the know targets by themselves may show about 80%-85% similar traffic to the cadence model, and the classifying module 424 may be configured to classify the desired target as a new threat target when the relatively higher percentage matched value indicates a value that is at least within the range of 80%-85% or more of similar traffic when the cadence model is run against the desired target.

According to exemplary embodiments, the generating module 420 may be configured to generate a relatively lower percentage matched value based on determining by the determining module 428 that the distances between the calls and the timing between the calls during the active sessions of the desired target are different across sessions, and then the classifying module 424 may be configured to classify the desired target as a regular traffic, and the determining module 428 may determine that no mitigation is required for the desired target.

According to exemplary embodiments, the background cadence data may show about 10%-15% similar traffic to the known targets, and the classifying module 424 may classify the desired target as a regular traffic when the relatively lower percentage matched value indicates a value at least within the range of 10%-15% or less when the cadence model is run against the desired target.

According to exemplary embodiments, the generating module 420 may be configured to generate a list of uniform resource locators (URLs) of all end points accessed by the desired target during the session. The creating module 430 may be configured to create a unique hash that represents a combination of the URLs.

According to exemplary embodiments, the generating module 420 may be configured to generate a list of top five most common hashes that represents the top five end points accessed by the desired target during the session.

According to exemplary embodiments, the generating module 420 may be configured to generate a list of top five most common hashes that represents the top five end points accessed by each of known targets, wherein a list of top five most common hashes for one known target is different from a list of top five most common hashes of other known targets.

According to exemplary embodiments, the generating module 420 may be configured to generate a machine learning model of list of the top five most common hashes of all known targets; and the executing module 432 may be configured to run the machine learning model of list of the top five most common hashes against the desired target to determine whether the desired target matches a known target that requires mitigation, or whether the desired target matches a real traffic that does not require mitigation.

According to exemplary embodiments, the classifying module 424 may be configured to classify the desired target as a new unknown target that requires mitigation when running the machine learning model of list of the top five most common hashes against the desired target by the executing module 432 results that the desired target neither matches a known target nor matches a real traffic. Thus, the applying module 416 may be configured to apply the mitigation algorithm to block the new unknown target.

Referring to FIGS. 1-4, an exemplary use case will be discussed below.

According to exemplary embodiments, test internet protocol (IP) from a hash of multiple header fields may be utilized by the TBDM 406 for cushion analysis. For example, a dashboard may be provided that shows IP addresses which have a relatively high degree of aggregator-like activity. See the Example 1 below:

Example 1

18.222.243.155
known other IP's for test case:
40.114.35.150
18.191.19.123
3.19.101.181
18.216.76.75
3.20.139.79

For the purpose of this analysis, a 24-hour window of a particular day was utilized. First, the TBDM 406 may be configured to get the function fingerprints from 1 cushion IP (e.g., 18.222.243.155) from the time where they were active. See Example 2 below:

Example 2 index="cfs_digital_88082" sourcetype="cfs_digital_httpds_access_st" urlPath!=*sixers*
| where xForwardfor = "18.222.243.155"
| stats values(urlPath) as URLs values(xForwardfor) as IPA by sessionId
| `DIGITAL__aggregatorName(IP,AggName)`
| eval tmp=URLs
| nomv tmp
| eval hashUrlList=md5(tmp)
| stats count as counthashes by hashUrlList, AggName | sort 0 AggName -counthashes | dedup 5 AggName | fields AggName, hashUrlList, counthashes Top 5 function pattern results generated by the TBDM 406 from IP 18.122.243.155 are illustrated bellow:

| | | |
|---|---|---|
| RealTraffic | 279b8a7b2b4103a2b7aae7493e1745f4 | 7 |
| RealTraffic | 51bc0c5ced865def67a3e1af5ec72603 | 7 |
| RealTraffic | a996f85e1948428dbe78da9578fbe796 | 5 |
| RealTraffic | 2beb21bba651d50395df2f10b4a6b829 | 4 |
| RealTraffic | e40d3a31fff740801e6a7d64f498eedc | 4 |

Next, the TBDM 406 checks for these top 5 most used hashes in other IP's. See example 3 below:

Example 3

```
index="cfs_digital_88082" sourcetype="cfs_digital_httpds_access_st"
urlPath!=*sixers*
| stats values(urlPath) as URLs values(xForwardfor) as IPÂ by sessionId
| `DIGITAL_aggregatorName(IP,AggName)`
| eval tmp=URLs
| nomv tmp
| eval hashUrlList=md5(tmp)
| where hashUrlList = "279b8a7b2b4103a2b7aae7493e1745f4"
or hashUrlList = "51bc0c5ced865def67a3e1af5ec72603"
or hashUrlList = "a996f85e1948428dbe78da9578fbe796"
or hashUrlList = "2beb21bba651d50395df2f10b4a6b829"
or hashUrlList = "e40d3a31fff740801e6a7d64f498eedc"
| stats count as counthashes dc(hashUrlList) by IP
```

Three of the known cushion IP's match with 80% same fingerprint, and it may look like the other two simply had no calls during this time window as listed below in table 1:

TABLE 1

| IP | counthashes | dc(hashUrlList) |
|---|---|---|
| 18.191.19.123 | 6 | 4 |
| 18.222.243.155 | 10 | 4 |
| 3.19.101.181 | 7 | 4 |
| 40.114.35.150 | 7 | 4 |

Finally, the TBDM 406 may show that the percentage predictor that these IPS are acting like aggregator is higher than the real traffic background average level.
Real Traffic Numbers:
Over the same time period, it was revealed that 13% predicted aggregator in real time traffic. 14834/(14834+98911)=0.1304 (i.e., 13%). See example 4 and table 2 below.

Example 4

```
index="cfs_digital_88082" sourcetype="cfs_digital_httpds_access_st"
urlPath != "*sixers*"
sessionId !="-" |
fields xForwardfor _time sessionId urlPath
| `DIGITAL_DCP_aggregatorName(xForwardfor, AggName)`
| where AggName = "RealTraffic"
| eval isAggregator=if( AggName != "RealTraffic" and
AggName != "Server" and AggName != "Robotics" and AggName !=
"dynaTrace", "Y", "N")
| sort 0 _time sessionId
| streamstats current=f last(_time) as prevtime by sessionId
| eval deltatime= _time − prevtime
| where deltatime < 100000
| stats values(xForwardfor) as ips sum(deltatime) as totaltime
avg(deltatime) as avgdelta stdev(deltatime) as stdevdelta count(urlPath)
as urlCount values(urlPath) as URLs values(isAggregator) as aggregators
by sessionId | nomv ips | nomv URLs | nomv aggregators
| apply "X25V1" as predictedAggregator
| eval correctPrediction=if(predictedAggregator=="Y", 1, 0)
| stats count sum(correctPrediction) avg(correctPrediction) by
predictedAggregator
```

TABLE 2

| predictedAggregator | count | sum(correctPrediction) | avg(correctPrediction) |
|---|---|---|---|
| N | 98911 | 0 | 0 |
| Y | 14834 | 14834 | 1 |

According to exemplary embodiments, the IPs from cushion show double this or more. See example 5 and table 3 below:

Example 5

```
index="cfs_digital_88082" sourcetype="cfs_digital_httpds_access_st"
urlPath != "*sixers*"
sessionId !="-"
| where xForwardfor="18.222.243.155" or
xForwardfor="40.114.35.150" or xForwardfor="18.191.19.123"
or xForwardfor="3.19.101.181" or xForwardfor="18.216.76.75"
or xForwardfor="3.20.139.79"
| fields xForwardfor _time sessionId urlPath
| `DIGITAL_DCP_aggregatorName(xForwardfor, AggName)`
| where AggName = "RealTraffic"
| eval isAggregator=if( AggName != "RealTraffic" and AggName !=
"Server" and AggName != "Robotics" and AggName != "dynaTrace",
"Y", "N")
| sort 0 _time sessionId
| streamstats current=f last(_time) as prevtime by sessionId
| eval deltatime= _time − prevtime
| where deltatime < 100000
| stats values(xForwardfor) as ips sum(deltatime) as totaltime
avg(deltatime) as avgdelta stdev(deltatime) as stdevdelta count(urlPath)
as urlCount values(urlPath) as URLs values(isAggregator) as aggregators
by sessionId | nomv ips | nomv URLs | nomv aggregators
| apply "X25V1" as predictedAggregator
| eval correctPrediction=if(predictedAggregator=="Y", 1, 0)
| stats count sum(correctPrediction) avg(correctPrediction) by ips
```

TABLE 3

| ips | count | sum(correctPrediction) | avg(correctPrediction) |
|---|---|---|---|
| 18.191.19.123 | 39 | 12 | 0.3076923076923077 |
| 18.222.243.155 | 55 | 14 | 0.2545454545454545 |
| 3.19.101.181 | 60 | 18 | 0.3 |
| 40.114.35.150 | 45 | 11 | 0.24444444444444444 |

As exemplified above, according to exemplary embodiments, the ML modeling by the TBDM 406 supports a higher degree of confidence that indicates which other IPs are cushion, as well that these IPs are all operating at a more aggregator-like timing and cadence.

For example, on a per session basis a first machine learning model (e.g., cadence model) can show the cadence (i.e., average time between each call as well as the standard deviation of times across each call, across sessions from a desired target). The comparing module 418 of the TBDM 406 can compare this cadence to the background cadence and the determining module 428 of the TBDM 406 can show that the background cadence gets predicted to have, e.g., 13% similar traffic to known targets. Known targets by themselves can show e.g., 85% similar traffic to the first machine learning model. Thus, when there is a new target, the TBDM 406 can run this first machine learning model against that new target as well, and when it is determined that running this first machine learning model against the new target outputs a number value that has larger and larger percent match, then the TBDM 406 can indicate that this new target is more and more likely a target (that requires mitigation) vs. background traffic (that does not require mitigation). When the number is lower and lower towards that 13% background noise, TBDM 406 can indicate that this new target is less likely to be a target (that requires mitigation) and more likely to be a real background traffic (that does not require mitigation).

With this cadence model, the TBDM 406 can predict the IP addresses most likely to be new targets (that require mitigation), and then feed them into the behavior model. If the TBDM 406 can detect behavior that is unlike real traffic based on a cadence prediction from the most likely IP list described above, then the TBDM 406 may automatically detect, classify and compile all the known places that this newly discovered target is operating, for mitigation through traffic shaping, blocking and other similar actions.

According to exemplary embodiments, the TBDM 406 may be configured to generate outlier behavior—values that do not look like the most common values over a range. Whenever the TBDM 406 finds these records that stand out as the top 5 most outliers, these related IPs are also fed into the behavior model as above (as with the cadence model).

Thus, according to exemplary embodiments, the TBDM 406 may be configured to achieve behavior based fingerprinting, cadence based fingerprinting and discovery, outlier based discovery of a target. Thus, according to exemplary embodiments, the TBDM 406 may be configured to achieve fully automated, machine learning, behavior based threat analysis and mitigation. According to exemplary embodiments, the TBDM 406 may also be utilized to automatically detect cyber threats and mitigate them in an efficient manner.

Figure 5:
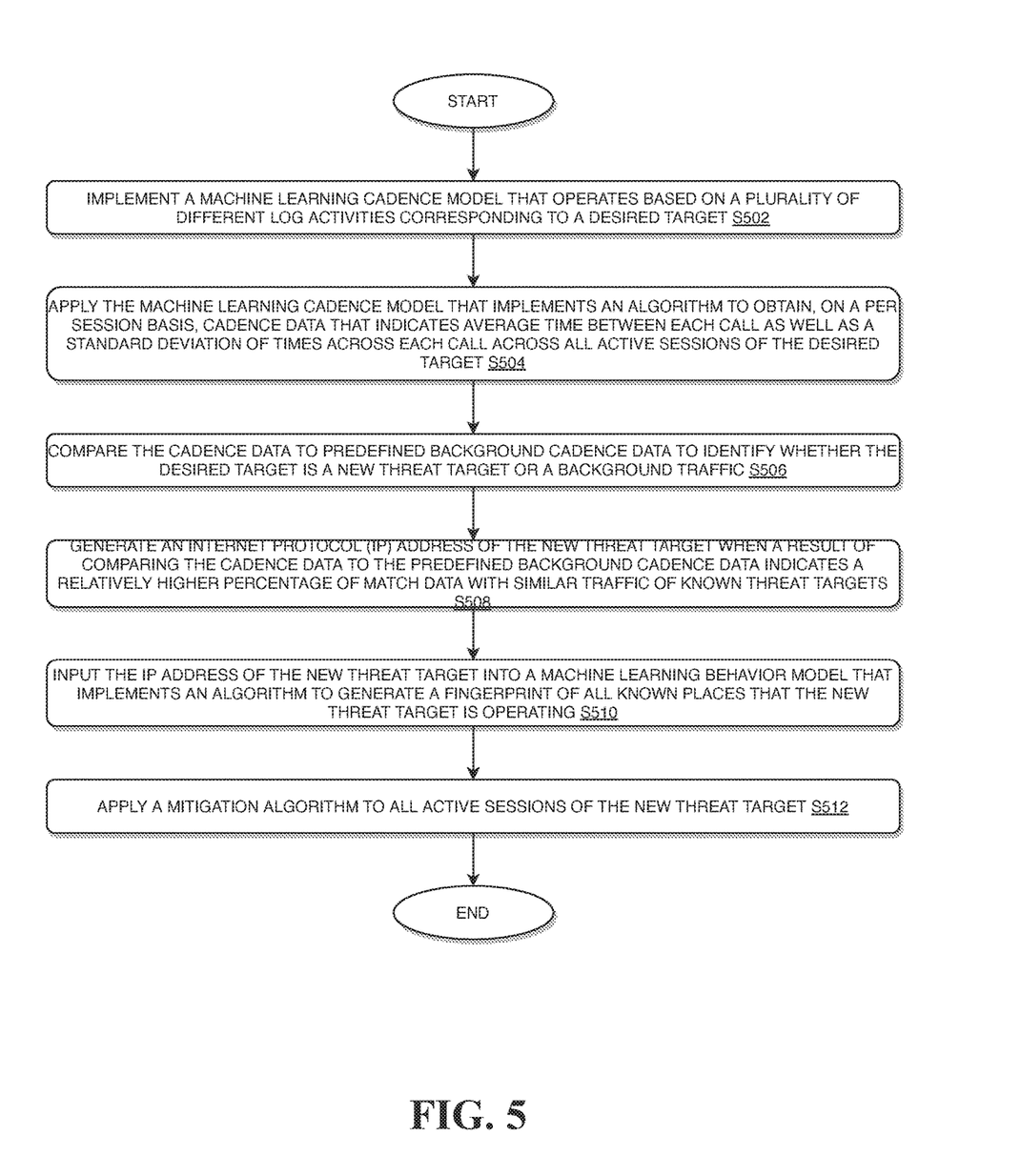
FIG. 5 illustrates a flow diagram for target behavior discovery and detection in accordance with an exemplary embodiment.

FIG. 5 illustrates a flow diagram for target behavior discovery and detection by utilizing one or more processors and one or memories in accordance with an exemplary embodiment.

In the process 500 of FIG. 5, at step S502, a machine learning cadence model may be implemented that operates based on a plurality of different log activities corresponding to a desired target.

At step S504, the machine learning cadence model may be applied that implements an algorithm to obtain, on a per session basis, cadence data that indicates average time between each call as well as a standard deviation of times across each call across all active sessions of the desired target.

At step S506, the cadence data may be compared to predefined background cadence data to identify whether the desired target is a new threat target or a background traffic.

At step S508, an internet protocol (IP) address of the new threat target may be generated when a result of comparing the cadence data to the predefined background cadence data indicates a relatively higher percentage of match data with similar traffic of known threat targets.

At step S510, the IP address of the new threat target may be inputted into a machine learning behavior model that implements an algorithm to generate a fingerprint of all known places that the new threat target is operating.

At step S512, a mitigation algorithm may be applied to all active sessions of the new threat target to mitigate the active sessions of the new target.

According to exemplary embodiments, the process 500 may further include: generating a relatively higher percentage matched value based on determining that the distances between the calls and the timing between the calls during the active sessions of the desired target are regular across sessions; classifying the desired target as a new threat target; and applying the mitigation algorithm to either shape the traffic or block all active sessions of the new threat target.

According to exemplary embodiments, know targets by themselves may show about 80%-85% similar traffic to the cadence model, and the process 500 may further include: classifying the desired target as a new threat target when the relatively higher percentage matched value indicates a value at least within the range of 80%-85% or more of similar traffic when the cadence model is run against the desired target.

According to exemplary embodiments, the process 500 may further include: generating a relatively lower percentage matched value based on determining that the distances between the calls and the timing between the calls during the active sessions of the desired target are different across sessions; classifying the desired target as a regular traffic; and determining that no mitigation is required for the desired target.

According to exemplary embodiments, the background cadence data may show about 10%-15% similar traffic to the known targets, and the process 500 further include: classify the desired target as a regular traffic when the relatively lower percentage matched value indicates a value at least within the range of 10%-15% or less when the cadence model is run against the desired target.

According to exemplary embodiments, the process 500 may further include: generating a list of uniform resource locators (URLs) of all end points accessed by the desired target during the session; and creating a unique hash that represents a combination of the URLs.

According to exemplary embodiments, the process 500 may further include: generating a list of top five most common hashes that represents the top five end points accessed by the desired target during the session.

According to exemplary embodiments, the process 500 may further include: generating a list of top five most common hashes that represents the top five end points accessed by each of known targets, wherein a list of top five most common hashes for one known target is different from a list of top five most common hashes of other known targets.

According to exemplary embodiments, the process 500 may further include: generating a machine learning model of list of the top five most common hashes of all known targets; and running the machine learning model of list of the top five most common hashes against the desired target to determine whether the desired target matches a known target that requires mitigation, or whether the desired target matches a real traffic that does not require mitigation.

According to exemplary embodiments, the process 500 may further include: classifying the desired target as a new unknown target that requires mitigation when running the machine learning model of list of the top five most common hashes against the desired target results that the desired target neither matches a known target nor matches a real traffic: and applying the mitigation algorithm to block the new unknown target.

According to exemplary embodiments, a non-transitory computer readable medium may be configured to store instructions for detecting and mitigating a target behavior. According to exemplary embodiments, the instructions, when executed, may cause a processor embedded within the TBDM 406 or the TBDD 402 to perform the following: implementing a machine learning cadence model that operates based on a plurality of different log activities corresponding to a desired target: applying the machine learning cadence model that implements an algorithm to obtain, on a per session basis, cadence data that indicates average time between each call as well as a standard deviation of times across each call across all active sessions of the desired target: comparing the cadence data to predefined background cadence data to identify whether the desired target is a new threat target or a background traffic; generating an internet protocol (IP) address of the new threat target when a result of comparing the cadence data to the predefined background cadence data indicates a relatively higher percentage of match data with similar traffic of known threat targets: inputting the IP address of the new threat target into a machine learning behavior model that implements an algorithm to generate a fingerprint of all known places that the new threat target is operating; and applying a mitigation algorithm to all active sessions of the new threat target. The processor may be the same or similar to the processor 104 as illustrated in FIG. 1 or the processor embedded within TBDD 202, TBDM 302, TBDM 306, TBDD 402, and TBDM 406.

According to exemplary embodiments, the instructions, when executed, may further cause the processor 104 to perform the following: generating a relatively higher percentage matched value based on determining that the distances between the calls and the timing between the calls during the active sessions of the desired target are regular across sessions; classifying the desired target as a new threat target; and applying the mitigation algorithm to either shape the traffic or block all active sessions of the new threat target.

According to exemplary embodiments, know targets by themselves may show about 80%-85% similar traffic to the cadence model, and the instructions, when executed, may further cause the processor 104 to perform the following: classifying the desired target as a new threat target when the relatively higher percentage matched value indicates a value at least within the range of 80%-85% or more of similar traffic when the cadence model is run against the desired target.

According to exemplary embodiments, the instructions, when executed, may further cause the processor 104 to perform the following: generating a relatively lower percentage matched value based on determining that the distances between the calls and the timing between the calls during the active sessions of the desired target are different across sessions; classifying the desired target as a regular traffic; and determining that no mitigation is required for the desired target.

According to exemplary embodiments, the background cadence data may show about 10%-15% similar traffic to the known targets, and the instructions, when executed, may further cause the processor 104 to perform the following: classify the desired target as a regular traffic when the relatively lower percentage matched value indicates a value at least within the range of 10%-15% or less when the cadence model is run against the desired target.

According to exemplary embodiments, the instructions, when executed, may further cause the processor 104 to perform the following: generating a list of uniform resource locators (URLs) of all end points accessed by the desired target during the session; and creating a unique hash that represents a combination of the URLs.

According to exemplary embodiments, the instructions, when executed, may further cause the processor 104 to perform the following: generating a list of top five most common hashes that represents the top five end points accessed by the desired target during the session.

According to exemplary embodiments, the instructions, when executed, may further cause the processor 104 to perform the following: generating a list of top five most common hashes that represents the top five end points accessed by each of known targets, wherein a list of top five most common hashes for one known target is different from a list of top five most common hashes of other known targets.

According to exemplary embodiments, the instructions, when executed, may further cause the processor 104 to perform the following: generating a machine learning model of list of the top five most common hashes of all known targets; and running the machine learning model of list of the top five most common hashes against the desired target to determine whether the desired target matches a known target that requires mitigation, or whether the desired target matches a real traffic that does not require mitigation.

According to exemplary embodiments, the instructions, when executed, may further cause the processor 104 to perform the following: classifying the desired target as a new unknown target that requires mitigation when running the machine learning model of list of the top five most common hashes against the desired target results that the desired target neither matches a known target nor matches a real traffic: and applying the mitigation algorithm to block the new unknown target.

According to exemplary embodiments as disclosed above in FIGS. 1-5, technical improvements effected by the instant disclosure may include platforms for implementing a multi-phase machine learning model and application solution for target behavior discovery and detection, thereby allowing appropriately classifying the behavior of the target in order to mitigate the actions of the target in an efficient manner, but the disclosure is not limited thereto. According to exemplary embodiments as disclosed above in FIGS. 1-5, technical improvements effected by the instant disclosure may further include platforms for applying the multi-phase machine learning model and application solution to discover the existence of a target early, classify the behavior of the target as like or unlike another known target, mitigate the actions of the target in their current state, adjust to evasive action by the target to identify and mitigate their behavior into the future, and discover other places where the target may be operating, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed: rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application Lo any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for detecting a target behavior by utilizing one or more processors and one or more memories, the method comprising:
    implementing a machine learning cadence model that operates based on a plurality of different log activities corresponding to a desired target;
    applying the machine learning cadence model that implements an algorithm to obtain, on a per session basis, cadence data that indicates average time between each call as well as a standard deviation of times across each call across all active sessions of the desired target;
    comparing the cadence data to predefined background cadence data to identify whether the desired target is a new threat target or a background traffic;
    generating an internet protocol (IP) address of the new threat target when a result of comparing the cadence data to the predefined background cadence data indicates a relatively higher percentage of match data with similar traffic of known threat targets;
    inputting the IP address of the new threat target into a machine learning behavior model that implements an algorithm to generate a fingerprint of all known places that the new threat target is operating; and
    applying a mitigation algorithm to all active sessions of the new threat target.

2. The method according to claim 1, further comprising:
    generating a relatively higher percentage matched value based on determining that the distances between the calls and the timing between the calls during the active sessions of the desired target are regular across sessions;
    classifying the desired target as a new threat target; and
    applying the mitigation algorithm to either shape the traffic or block all active sessions of the new threat target.

3. The method according to claim 2, wherein know targets by themselves show about 80%-85% similar traffic to the cadence model, the method further comprising:

classifying the desired target as a new threat target when the relatively higher percentage matched value indicates a value at least within the range of 80%-85% or more of similar traffic when the cadence model is run against the desired target.

4. The method according to claim 1, further comprising:
generating a relatively lower percentage matched value based on determining that the distances between the calls and the timing between the calls during the active sessions of the desired target are different across sessions;
classifying the desired target as a regular traffic; and
determining that no mitigation is required for the desired target.

5. The method according to claim 4, wherein the background cadence data shows about 10%-15% similar traffic to the known targets, the method further comprising:
classifying the desired target as a regular traffic when the relatively lower percentage matched value indicates a value at least within the range of 10%-15% or less when the cadence model is run against the desired target.

6. The method according to claim 1, further comprising:
generating a list of uniform resource locators (URLs) of all end points accessed by the desired target during the session; and
creating a unique hash that represents a combination of the URLs.

7. The method according to claim 6, further comprising:
generating a list of top five most common hashes that represents the top five end points accessed by the desired target during the session.

8. The method according to claim 7, further comprising:
generating a list of top five most common hashes that represents the top five end points accessed by each of known targets, wherein a list of top five most common hashes for one known target is different from a list of top five most common hashes of other known targets.

9. The method according to claim 8, further comprising:
generating a machine learning model of list of the top five most common hashes of all known targets; and
running the machine learning model of list of the top five most common hashes against the desired target to determine whether the desired target matches a known target that requires mitigation, or whether the desired target matches a real traffic that does not require mitigation.

10. The method according to claim 9, further comprising:
classifying the desired target as a new unknown target that requires mitigation when running the machine learning model of list of the top five most common hashes against the desired target results that the desired target neither matches a known target nor matches a real traffic; and
applying the mitigation algorithm to block the new unknown target.

11. A system for detecting a target behavior, the system comprising:
a database for storing a machine learning cadence model and a machine learning behavior model; and
a processor operatively connected to the database via a communication network, wherein the processor is configured to:
implement the machine learning cadence model that operates based on a plurality of different log activities corresponding to a desired target;
apply the machine learning cadence model that implements an algorithm to obtain, on a per session basis, cadence data that indicates average time between each call as well as a standard deviation of times across each call across all active sessions of the desired target:
compare the cadence data to predefined background cadence data stored in the database to identify whether the desired target is a new threat target or a background traffic:
generate an internet protocol (IP) address of the new threat target when a result of comparing the cadence data to the predefined background cadence data indicates a relatively higher percentage of match data with similar traffic of known threat targets;
input the IP address of the new threat target into the machine learning behavior model that implements an algorithm to generate a fingerprint of all known places that the new threat target is operating; and
apply a mitigation algorithm to all active sessions of the new threat target.

12. The system according to claim 11, wherein the processor is further configured to:
generate a relatively higher percentage matched value based on determining that the distances between the calls and the timing between the calls during the active sessions of the desired target are regular across sessions;
classify the desired target as a new threat target; and
apply the mitigation algorithm to either shape the traffic or block all active sessions of the new threat target.

13. The system according to claim 12, wherein know targets by themselves show about 80%-85% similar traffic to the cadence model, and wherein the processor is further configured to:
classify the desired target as a new threat target when the relatively higher percentage matched value indicates a value at least within the range of 80%-85% or more of similar traffic when the cadence model is run against the desired target.

14. The system according to claim 11, wherein the processor is further configured to:
generate a relatively lower percentage matched value based on determining that the distances between the calls and the timing between the calls during the active sessions of the desired target are different across sessions;
classify the desired target as a regular traffic; and
determine that no mitigation is required for the desired target.

15. The system according to claim 14, wherein the background cadence data shows about 10%-15% similar traffic to the known targets, and wherein the processor is further configured to:
classify the desired target as a regular traffic when the relatively lower percentage matched value indicates a value at least within the range of 10%-15% or less when the cadence model is run against the desired target.

16. The system according to claim 11, wherein the processor is further configured to:
generate a list of uniform resource locators (URLs) of all end points accessed by the desired target during the session; and
create a unique hash that represents a combination of the URLs.

17. The system according to claim 16, wherein the processor is further configured to:

generate a list of top five most common hashes that represents the top five end points accessed by the desired target during the session.

18. The system according to claim 17, wherein the processor is further configured to:
generate a list of top five most common hashes that represents the top five end points accessed by each of known targets, wherein a list of top five most common hashes for one known target is different from a list of top five most common hashes of other known targets.

19. The system according to claim 18, wherein the processor is further configured to:
generate a machine learning model of list of the top five most common hashes of all known targets; and
run the machine learning model of list of the top five most common hashes against the desired target to determine whether the desired target matches a known target that requires mitigation, or whether the desired target matches a real traffic that does not require mitigation.

20. A non-transitory computer readable medium configured to store instructions for detecting a target behavior, wherein when executed, the instructions cause a processor to perform the following:

implementing a machine learning cadence model that operates based on a plurality of different log activities corresponding to a desired target;
applying the machine learning cadence model that implements an algorithm to obtain, on a per session basis, cadence data that indicates average time between each call as well as a standard deviation of times across each call across all active sessions of the desired target;
comparing the cadence data to predefined background cadence data to identify whether the desired target is a new threat target or a background traffic;
generating an internet protocol (IP) address of the new threat target when a result of comparing the cadence data to the predefined background cadence data indicates a relatively higher percentage of match data with similar traffic of known threat targets;
inputting the IP address of the new threat target into a machine learning behavior model that implements an algorithm to generate a fingerprint of all known places that the new threat target is operating; and
applying a mitigation algorithm to all active sessions of the new threat target.

* * * * *